United States Patent
Manceau

[11] 3,779,680
[45] Dec. 18, 1973

[54] CONTROL EQUIPMENT FOR AN INJECTION MOULDING MACHINE

[76] Inventor: Marcel Manceau, 4, rue du Four, Congis, France

[22] Filed: Apr. 15, 1971

[21] Appl. No.: 134,407

[30] Foreign Application Priority Data
Apr. 17, 1970  France .............................. 7013891

[52] U.S. Cl. ............................................. 425/145
[51] Int. Cl. ............................................. B29c 3/06
[58] Field of Search................... 425/145, 135, 242, 425/247

[56] References Cited
UNITED STATES PATENTS
3,509,600   5/1970   Noble ................................ 425/145
3,538,549  11/1970   Hehl .................................. 425/145
3,642,403   2/1972   Havlik................................ 425/145

*Primary Examiner*—H. A. Kilby, Jr.
*Attorney*—Woodhams, Blanchard and Flynn

[57] ABSTRACT

Control equipment for an injection-molding machine includes a hydraulic circuit fitted with electrically operated distributors for controlling the operation of various hydraulic receivers for displacing the various moving elements of the machine. Such electrically operated distributors are of the type that incorporate constriction means regulable under the action of hydraulic pilot units acting as pressure reducers and the displacement of which is a function of the strength of the current applied to corresponding control electromagnets. A pressure compensating means is provided for regulating the flow through the distributors irrespective of the pressure used. Means convert the position of the various moving elements of the machine and the pressure in the supply passages of the corresponding hydraulic receivers into electrical values. Means display the required predetermined position relating to the speed of displacement of the moving elements and to the pressure in the corresponding hydraulic receivers. Electronic apparatus is provided for processing such electrical values and for producing control signals for the electromagnets of the various distributors as a function of such predetermined conditions.

6 Claims, 4 Drawing Figures

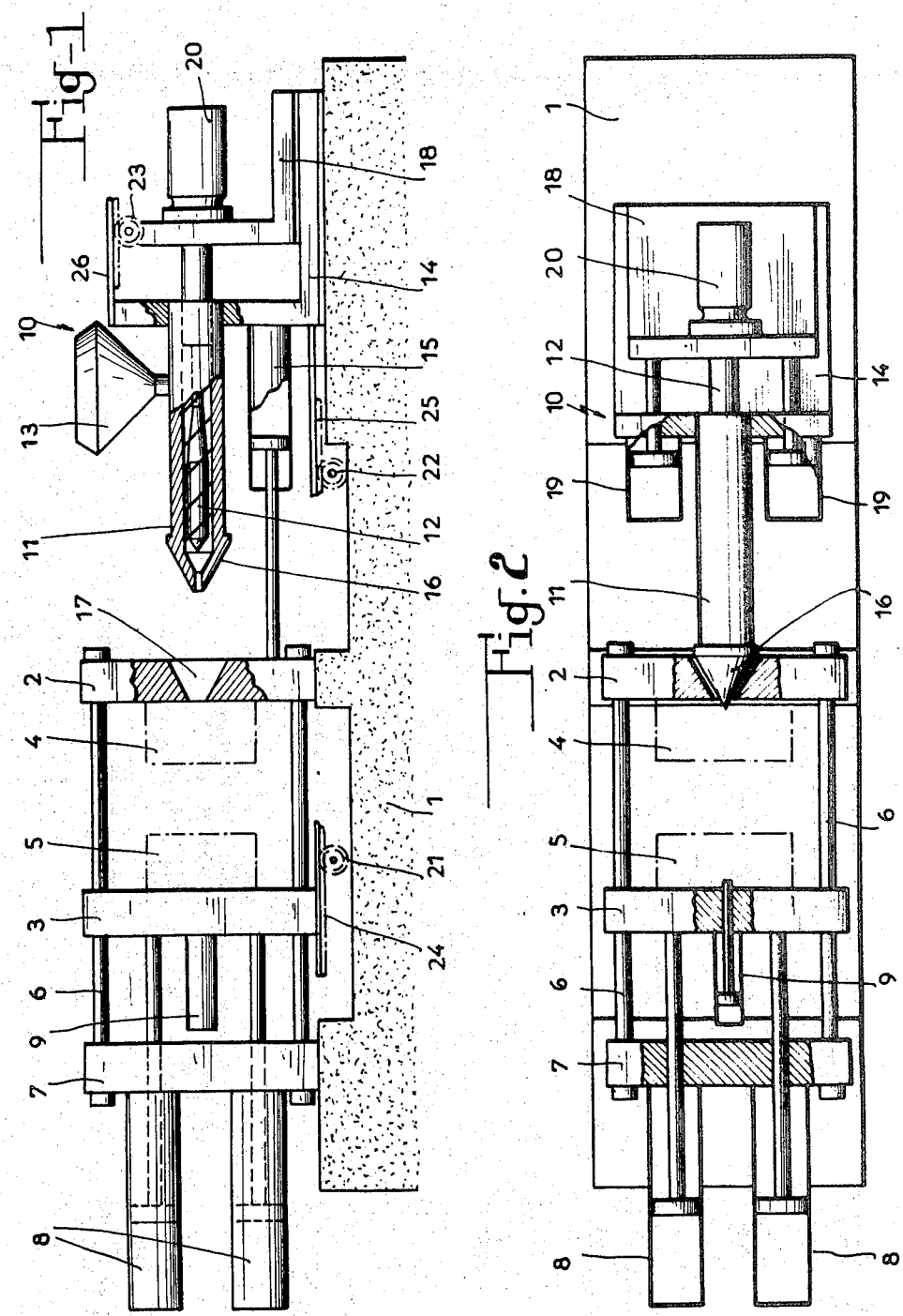

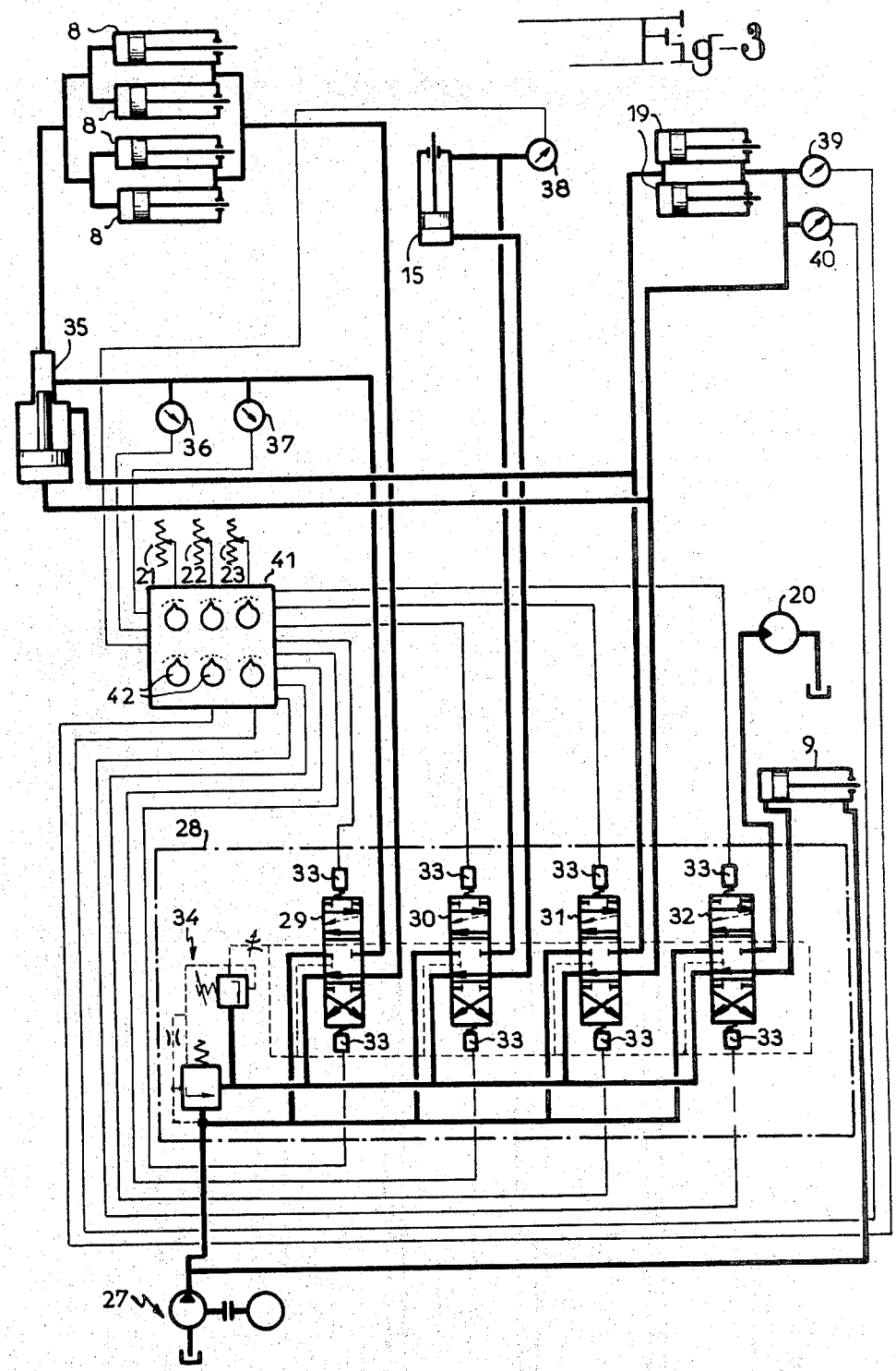

CONTROL EQUIPMENT FOR AN INJECTION MOULDING MACHINE

The present invention concerns control equipment for an injection-moulding machine and comprising a hydraulic circuit fitted with electrically operated distributors for controlling the operation of the various hydraulic receivers for displacing the various moving elements of the machine.

Injection-moulding machines currently in use generally operate in an entirely automatic manner, because of the use of electro-hydraulic control equipment. Nevertheless, in certain cases, for example that of moulding a part having a complicated cross-section, it is required that the various moving elements of the machine, i.e. mainly the moving platen for opening and closing the mould, and the screw for injecting the material to be shaped into the mould, should move at variable speeds during the operating cycle. It is also sometimes required, for the same reasons, that the pressures applied to these moving elements by the appropriate hydraulic rams or plungers should be capable of variation.

In fact, the need for variable speeds and pressures occurs particularly during the course of injection. Generally, injection is started slowly so as to avoid initial turbulence, and acceleration then takes place so as to fill the mould rapidly. This acceleration is followed by a slowing down in the case where the mould comprises a core that could cause weld-lines; then, further acceleration occurs and finally a slowing down at the end of the stroke so as to avoid the formation of burrs along the line at which the two halves of the mould meet. It is at this moment that a reduced pressure is required. At the end of the predetermined period, determined by means of a time-switch, a still lower pressure is applied in order to maintain the injection pressure without causing internal stresses in the moulded parts.

Hitherto, for the purpose of obtaining variable speeds and pressures, it has been necessary to employ manually or automatically operated flow-regulators and pressure-regulating valves, or variable-delivery pumps incorporating control means. Such items of equipment are however generally quite expensive, particularly when they are automatically controlled by electrical means, and their presence also considerably increases the complexity of the pipework, this in the end raising the total cost of the installation to an appreciable extent.

The main object of the present invention is to overcome these drawbacks by providing control equipment which is simple and inexpensive, yet is very flexible in use.

To achieve this, an object of the invention is to provide control equipment which is mainly characterized in that it comprises, in combination: electrically operated distributors of the type incorporating constriction means that are regulable under the action of hydraulic pilot units acting as pressure-reducers and the displacement of which is a function of the strength of the current passed to the corresponding control electromagnet; a pressure-compensating means for regulating the flow, irrespective of the pressure used; means for converting the position of the various moving elements of the machine and the pressure obtaining in the supply passages of the corresponding hydraulic receivers into electrical values; means for displaying the required predetermined conditions relating to the speed of displacement of the moving elements and to the pressure in the corresponding hydraulic receivers; and electronic apparatus for processing said electrical values and for producing control signals for the electromagnets of the various distributors as a function of said predetermined conditions.

Thus, because of the use of electrically operated distributors incorporating regulable constriction means, no supplementary hydraulic element is necessary for obtaining variable speeds and pressures, and this greatly reduces the complexity, the space occupied by, and the cost of the installation. Furthermore, since the control of these variable speeds and pressures is achieved through the agency of electronic apparatus, it is easily possible to obtain as many different speeds and pressures as are required during one and the same operating cycle, and this can be done with great precision since the electronic apparatus receives all the information as regards position and pressure that it requires. It will thus be appreciated that control equipment of this kind will be very flexible in use and that the machine so equipped will be capable of use in the moulding of the most complicated parts.

One embodiment of the invention will now be described by way of example and by reference to the attached drawings in which:

FIG. 1 is a simplified elevational view of an injection-moulding machine fitted with control equipment in accordance with the invention;

FIG. 2 is a plan view of this machine; and

FIG. 3 is a simplified diagram of its electro-hydraulic control equipment.

Figure 4:
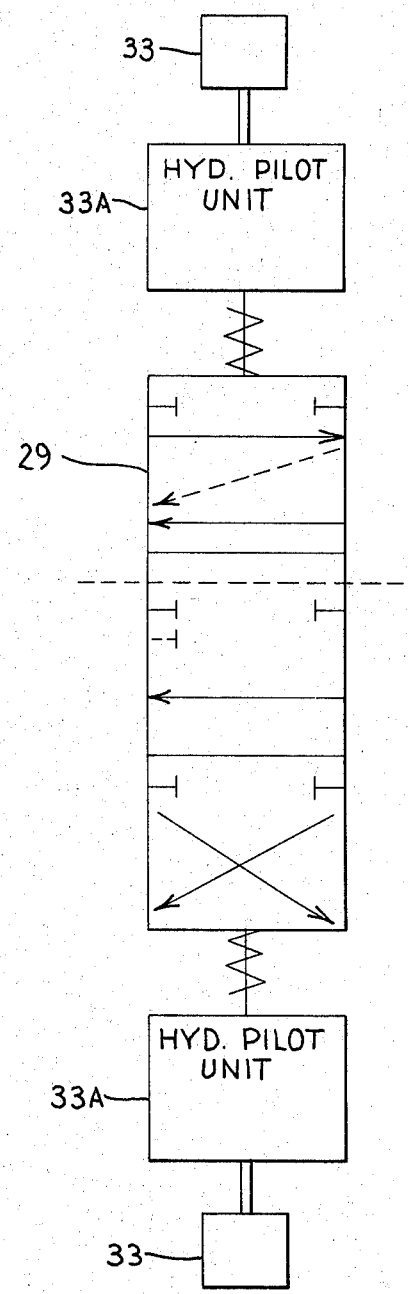
FIG. 4 is a more detailed diagrammatic view of one of the hydraulic distributors of FIG. 3.

The machine illustrated in FIGS. 1 and 2 comprise firstly, on a frame 1, a fixed platen 2 and a moving platen 3 carrying the two halves 4 and 5 respectively of the mould. The moving platen 3 is guided in known manner by four horizontal bars 6, which are arranged at the corners of a square and the ends of which are secured respectively to the fixed platen 2 and to a support plate 7 solidly attached to the frame 1. This moving platen 3 is disposed along the guide bars 6 by means of a group of four hydraulic cylinder and piston units 8 carried by the support plate 7. A hydraulic cylinder and piston unit 9 is also provided at the centre of the moving plate for the purpose of ejecting the moulded workpiece.

The machine is completed by an injection unit 10, comprised principally of a case 11 in which is disposed a plasticizing screw 12 to which plastics material is fed by means of a reed hopper 13.

The case 11 is carried on a bracket 14 which is mounted to slide on the frame 1 and the movement of which is effected by a hydraulic cylinder and piston unit 15, seen in FIG. 1. The end of this case 11 is fitted with an injection nozzle 16 which is adapted to pass through the fixed platen 2 by way of an opening 17 in said platen, so that the product to be moulded is passed directly into the mould formed by the two halves 4 and 5.

The screw 12 is supported by a second bracket 18, which is mounted to slide relatively to the first bracket 14 and which is moved by two hydraulic cylinder and piston units seen in FIG. 2. This screw is thus enabled to execute translatory movements inside the case 11 and it can also be rotated by means of a hydraulic motor 20 mounted on the bracket 18.

Also illustrated in FIG. 1 are three potentiometers 21, 22 and 23 the purpose of which will appear more clearly in the following. The potentiometer 21 is mounted on the frame 1, and its slide is solidly connected to a pinion which engages a rack 24 secured to the moving platen 3. The potentiometer 22 is likewise mounted on the frame 1, and the pinion to which its slide is firmly connected engages a rack 25 secured to the bracket 24 of the injection unit 10. As regards the potentiometer 23, this is mounted on the bracket 18, and the pinion to which its slide is connected is engaged with a rack 26 secured to the bracket 14.

In accordance with the invention, this injection-moulding machine is fitted with electro-hydraulic control equipment illustrated schematically in FIG. 3. The diagram of FIG. 3 firstly shows the various hydraulic cylinder and piston units 8, 15 and 19 for displacing the moving parts of the machine, as well as the hydraulic motor 20, that causes the screw 12 to rotate, and the ejection cylinder and piston unit 9. All the hydraulic elements are supplied with pressurized fluid from a source 27 by means of a hydraulic control assembly 28 which may be of very compact form.

The hydraulic assembly 28 is mainly constituted by four electrically operated distributors 29, 30, 31 and 32, which are of the type incorporating constricting means that are variable under the action of hydraulic pilot units 33A (FIG. 4) which act as pressure-reducers and are actuated by electromagnets as indicated at 33 for example. Furthermore, the displacement of each of these pilot units is a function of the strength of the continuous current that is passed to the corresponding control electromagnet and thus sets up a pilot pressure that is variable. Fitted between the four electrically operated distributors and the supply source 27 is a one-piece unit 34 comprising a pressure-compensating valve, a safety valve and constriction means which enable a regular flow to be established irrespective of the pressure being used.

The electrically operated distributor 29 controls the operation of the four cylinder and piston units 8 for displacing the moving platen 3 and consequently, for opening and closing the mould 4-5. Also provided is a pressure-amplifier 35 for providing the final high pressure required for closing the mould. This pressure-amplifier 35 is fed by way of the electrically operated distributor 31 which normally controls the operation of the cylinder and piston units 19 for imparting translatory movement to the screw 12. The electrically operated distributor 30 controls the operation of the cylinder and piston units 15 for advancing and retracting the injection unit 10. Finally, the electrically operated distributor 32 alternately controls the operation of the hydraulic motor 20 and the operation of the ejection cylinder and piston unit 9.

A certain number of pressure transducers are also provided for measuring the fluid pressure obtaining in the various supply passages to the hydraulic cylinder and piston units with which the machine is equipped. Two transducers 36 and 37 are provided on the base side of the unit 8, a transducer 38 is provided on the rod side of unit 15, and two transducers 39 and 40 are provided on the rod side of the units 19. All these transducers convert the corresponding pressure signal into an electrical value which is applied to the input side of electronic apparatus shown schematically at 41. This apparatus also continuously receives signals regarding the position of the various moving parts of the machine and provided by the three potentiometers 21, 22 and 23, and said electronic apparatus thus produces at its output and as a function of all these data the appropriate control signals for the electromagnets 33 of the four electrically operated distributors 29 to 32.

Apart from the time-switches necessary for the operating cycle of the machine, the electronic appartus 41 also comprises a certain number of regulating buttons 42 whereby the required predetermined conditions of operation of the machine can be displayed in a simple manner.

The general mode of operation of an injection-moulding machine is well known and will not therefore be described here. It will simply be pointed out that because of the use of electrically operated distributors of the type incorporating regulable constriction means, the output of which is regulated by the one-piece unit 34, it is possible to vary the fluid flow in a very simple manner and consequently to vary the velocity of displacement of the various elements controlled by these electrically operated distributors. Furthermore, since these distributors are themselves controlled by electronic equipment 41 which is constantly supplied with signals regarding the position of the moving elements of the machine, by way of the potentiometers 21 to 23, as many different speeds can be obtained as are required for the moving elements, and at the same time the pressures can be varied because of the use of the pressure transducers 36 to 40.

It should be noted however that in order to obtain simultaneously and with sufficient precision different speeds in the various moving elements of the machine, it is necessary on the one hand that the pressures used should be of the same order of magnitude and on the other hand, that these pressures should be substantially lower than the maximum pressure that can be supplied by the supply source 27, constituted for example by a pump, the delivery of which should naturally be slightly greater than the sum of the outputs required.

When the pressures used differ greatly from each other, variations due to interference in the circuit and to heating up are found to occur just as if simple constricting means without pressure-compensation arrangements were used. In this case, and in order to effect precise regulation, it is preferable to provide the supply source 27 with a storage means that will limit the capacity of the pump and the power of the electric motor in the motor-pump assembly. Each electrically operated distributor should also be associated with a one-piece unit 34 in which the safety valve will obviously be replaced by a pressure-reducing valve. In this way, it is possible to obtain simultaneously several precise velocities of displacement of the moving elements of the machine, even if the corrsponding pressures used differ greatly from each other. This arrangement is obviously more complicated than the previous one, but it enables a better production rhythm in the machine and improved regulation of the displacement velocities to be achieved simultaneously.

It might also be mentioned that the load-loss in the hydraulic assembly 28 is minimal for a maximum delivery, whereas with the known systems controlled by servo-valves, a load-loss of at least approximately 70 bars is experienced.

Finally, because of the regulating buttons 42 provided on the electronic apparatus 41, it is a very simple matter to adjust the automatic operation of the machine to suit the shape of the workpieces to be moulded or the nature of the thermoplastic material used.

It will thus be seen that the control equipment in accordance with the invention is very flexible in use and that the machine thus equipped lends itself to the manufacture of extremely complicated moulded workpieces.

What is claimed is:

1. Control equipment for an injection-moulding machine having various moving elements and a plurality of hydraulic receivers for displacing such moving elements, such receivers having supply passages, such control equipment comprising in combination: a plurality of electrically operated distributors of the type incorporating control electromagnets, hydraulic pilot units and constriction means that are regulable under the action of the hydraulic pilot units acting as pressure-reducers and the displacement of which is a function of the strength of the current passed to the corresponding control electromagnet; means coupling each distributor to at least one corresponding hydraulic receiver; a pressure-compensating means for regulating the hydraulic flow through said distributors, irrespective of the pressure used; a pressurized hydraulic fluid supply and means connecting each of said distributors and said pressure compensating means in circuit with said supply; means for converting the position of the various moving elements of the machine and the pressure obtaining in the supply passages of the corresponding hydraulic receivers into electrical values; means for displaying the required predetermined conditions relating to the speed of displacement of the moving elements and to the pressure in the corresponding hydraulic receivers; and electronic apparatus for processing said electrical values and for producing control signals for the electromagnets of the various distributors as a function of said predetermined conditions;

whereby to enable with close control variable speeds and pressures in said hydraulic receivers substantially irrespective of the hydraulic pressure used.

2. Control equipment for an injection moulding machine having a mould including closeable mould part, first hydraulic receiver means for closing said mould part, plasticizer means having a movable support and movable injection means associated therewith, second hydraulic receiver means for moving said support and therewith said plasticizer means into adjacency with said mould and third hydraulic receiver means for moving said injection means for injecting material from said plasticizer means into said mould, the control equipment comprising in combination:

first, second and third electrically operated distributors of the type incorporating control electromagnets, hydraulic pilot units and constriction means that are regulable under the action of the hydraulic pilot units acting as pressure-reducers and the displacement of which is a function of the strength of the current passed to the corresponding control electromagnet;

hydraulic supply and return lines individually coupling said first, second and third distributors at one side thereof to said first, second and third hydraulic receiver means, respectively;

a pressurized hydraulic fluid supply coupled to the other side of said distributors;

means including a pressure compensating valve coupled to said supply and also to said other side of said first, second and third distributors for regulating the hydraulic flow through said first, second and third distributors irrespective of the pressure used;

first, second and third potentiometer means mechanically coupled to and adjustable in response to movement of said closeable mould, said movable support and said movable injection means, respectively, for converting the positions thereof to electrical values;

first, second and third pressure transducer means connected to said hydraulic supply lines of said first, second and third hydraulic receiver means, respectively, for converting pressure signals to electrical values;

means for displaying required predetermined conditions relating to the speed of displacement of said closeable mould part, support and injection means and to the pressure in the corresponding first, second and third hydraulic receivers; and electronic apparatus for processing said electrical values and for producing control signals for the electromagnets of each of said first, second and third distributors as a function of corresponding ones of said predetermined conditions;

whereby hydraulic flow velocity and pressure responsible for movement of said mould part, support and injection means is controlled and applied through three similar, separate and parallel paths, each including one said distributor, set of supply and return lines, pressure transducer means, hydraulic receiver means and potentiometer means.

3. The control equipment of claim 2, in which the injection moulding machine has means for ejecting a workpiece from the mould and fourth hydraulic receiver means for actuating said workpiece ejection means, said machine further having in said plasticizer means a rotatable plasticizing screw and fifth hydraulic receiver means for rotating such screw, said control equipment further including a fourth electrically operated distributor similar in type to said first, second and third distributors and coupled on one side thereof through hydraulic lines to said fourth and fifth hydraulic receiver means, said fourth distributor being coupled on the other side thereof to said fluid supply and said means including said pressure compensating valve and in a manner similar to the corresponding connections of said first, second and third distributors, the control electromagnet of said fourth distributor being connected for receiving control signals from said electronic apparatus.

4. The control equipment of claim 3, in which said means including said pressure compensating valve further includes a safety valve.

5. The control equipment of claim 3, in which said means including said pressure compensating valve includes a pressure reducing valve, said control equipment further including storage means associated with said hydraulic fluid source, whereby several simultaneous and precisely controlled velocities of displacement of said hydraulic receiver means are obtainable despite variations in the pressure supply to each.

6. The control equipment of claim 3, including pressure amplifier means connected in the supply line between said first distributor and said first hydraulic receiver means for providing the final high pressure required for closing the mould, feed lines connecting said pressure amplifier means to the supply and return line interconnecting said third distributor and said third hydraulic receiving means associated with said ejection means, said first pressure transducer means associated with said first receiver means being connected between first distributor and said pressure amplifier means.

* * * * *